US008330652B2

(12) United States Patent
Morrison (10) Patent No.: US 8,330,652 B2
(45) Date of Patent: Dec. 11, 2012

(54) METHODS AND APPARATUSES FOR REDUCING TIME TO ESTIMATE A POSITION USING A SATELLITE POSITIONING SYSTEM

(75) Inventor: William James Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 12/612,245

(22) Filed: Nov. 4, 2009

(65) Prior Publication Data

US 2011/0102251 A1    May 5, 2011

(51) Int. Cl.
  *G01S 19/20*  (2010.01)
  *G01S 19/40*  (2010.01)
(52) U.S. Cl. ............................ 342/357.58; 342/357.23
(58) Field of Classification Search ............. 342/357.23, 342/357.58, 357
  See application file for complete search history.

(56) References Cited

U.S. PATENT DOCUMENTS

| 6,798,377 | B1 | 9/2004 | Lupash et al. |
| 2005/0043038 | A1 | 2/2005 | Maanoja et al. |
| 2005/0192024 | A1 | 9/2005 | Sheynblat |
| 2006/0009235 | A1* | 1/2006 | Sheynblat et al. ......... 455/456.1 |
| 2006/0229805 | A1* | 10/2006 | Diggelen ...................... 701/207 |
| 2007/0159384 | A1* | 7/2007 | Kangas .................... 342/357.04 |
| 2009/0256745 | A1 | 10/2009 | Pon | |

OTHER PUBLICATIONS

International Search Report and Written Opinion—PCT/US2010/055314—International Search Authority, European Patent Office,Feb. 3, 2011.
Lee, et al., "Analysis of range and position comparison methods as a means to provide GPS integrity in the user receiver" Proceedings of the Institute of Navigation Annual Meeting, XX, XX, No. 42nd, Jun. 24, 1986, p. 17PP, XP007902751, the whole document.

\* cited by examiner

*Primary Examiner* — Jack W Keith
*Assistant Examiner* — Fred H Mull
(74) *Attorney, Agent, or Firm* — Shyam K. Parekh; Howard H. Seo (57) ABSTRACT

Methods and apparatuses are provided that may be implemented in various electronic devices to possibly reduce a first-time-to-fix and/or otherwise increase the performance or efficiency of a device in determining its current estimated position. In some embodiments, it may be determined whether current estimated position is valid based, at least in part, on pseudorange measurement information and pseudorange predicted information, and such determining may include obtaining a sum-of-squares of an a-posteriori measurement residual associated with the pseudorange measurement information and the pseudorange predicted information.

27 Claims, 3 Drawing Sheets

METHODS AND APPARATUSES FOR REDUCING TIME TO ESTIMATE A POSITION USING A SATELLITE POSITIONING SYSTEM

BACKGROUND

1. Field

The subject matter disclosed herein relates to electronic devices, and more particularly to methods and apparatuses for use in and/or with a device capable of providing or otherwise supporting position, velocity, and/or time or timing related estimations.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and in particular satellite positioning systems (SPS) such as, for example, the global positioning system (GPS) and other like Global Navigation Satellite Systems (GNSS). SPS enabled devices, for example, may receive wireless SPS signals that are transmitted by orbiting satellites of a GNSS and/or other terrestrial based transmitting devices. The received SPS signals may, for example, be processed to determine a global SPS system time, a range or pseudorange, an approximate or accurate geographical location, altitude, and/or speed of the SPS enabled device. Consequently, various position and/or velocity estimation processes may be supported, at least in part, using an SPS enabled device.

In some instances, certain navigation services may employ continuous or substantially continuous SPS position tracking. For example, a ship or airplane may be provided with a dedicated device to provide continual tracking. In other instances, certain navigation services may be employed periodically or at other select times. For example, a mobile station or other like device may selectively perform certain navigation services, e.g., as needed.

It may be useful, for example, to implement techniques that may reduce the amount of time used and/or power consumed by certain SPS enabled devices to determine estimated position information. Such techniques may be useful to various different types of devices, including but not necessarily limited to SPS enabled devices that may attempt to determine estimated position periodically or at other select times.

SUMMARY

In accordance with certain aspects, techniques are provided herein which may be implemented via various methods and apparatuses to allow a device having a satellite positioning system (SPS) receiver to possibly reduce a first-time-to-fix and/or otherwise increase its performance or efficiency in determining its current estimated position based, at least in part, on received SPS signals.

By way of example, a method may be implemented in a SPS receiver enabled device, which includes generating pseudorange (PR) predicted information associated with a plurality of space vehicles (SVs) associated with the SPS based, at least in part, on current estimated position information associated with the device. Here, for example, such current estimated position may be based, at least in part, on PR measurement information associated with the plurality of SVs, wherein the PR measurement information may be based, at least in part, on previously estimated position information associated with the device and recently detected SPS signal code peak information. The method may also include determining whether the current estimated position information is valid based, at least in part, on the PR measurement information and the PR predicted information, and in response to determining that the current estimated position information is valid, using the current estimated position information to support at least one navigation service associated with the device.

In certain further implementations, the method may include generating the PR measurement information based, at least in part, on one or more electronic signals representing the previously estimated position information, and generating the current estimated position information. Here, for example, such a method may include generating the PR measurement information based also, at least in part, on SV positioning information, and/or locally-maintained SPS time information.

In certain further implementations, the method may include, in response to determining that the current estimated position information is not valid, initiating at least one additional process to determine a new estimated position of the device.

In certain further implementations, the method may include generating a difference between the PR measurement information and the PR predicted information, and comparing the difference to a threshold value. Here, for example, such threshold value may be predetermined and stored in a memory of the device. In certain example implementations, the difference between the PR measurement information and the PR predicted information may comprise a residual associated with the PR measurement information and the PR predicted information.

In certain further implementations, the method may include obtaining a sum-of-squares of an a-posteriori measurement residual associated with said PR measurement information and said PR predicted information.

In certain further implementations, the method may include updating position uncertainty information as represented by one or more electronic signals stored in a memory of the device.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 3 is a flow diagram illustrating an example process that may be implemented in whole or part in a device, for

DETAILED DESCRIPTION

In accordance with certain example implementations, a device having a satellite positioning system (SPS) receiver may benefit by implementing a method that may improve performance of a navigation service and/or other like process in certain situations. Here, for example, a method may be implemented to possibly reduce a first-time-to-fix and/or otherwise increase the performance or efficiency of a device in determining its current estimated position based, at least in part, on received SPS signals.

By way of example but not limitation, the example methods and apparatuses described herein may be implemented as part of, and/or to operatively support, various positioning processes (e.g., navigation services) associated with one or more Global Navigation Satellite Systems: (GNSSs). Such positioning processes may, for example, be performed by a device operating in a 'standalone' mode. In other examples, such positioning processes, may be performed by a device operating in an 'assisted' mode with one or more other devices. In certain example implementations, a device may take the form of a mobile station (MS).

As described in greater detail below, certain example methods and apparatuses may be implemented to determine a set of pseudorange (PR) measurements associated with detected code peaks of SPS signals as received from a plurality of space vehicles (SVs) based, at least in part, on previously estimated position information. In certain example implementations, the set of PR measurements may be determined based additionally on stored (e.g., known or otherwise determinable) SV positioning information, and/or locally-maintained SPS time information. Here, previously estimated position information may be stored in memory and associated with or otherwise have resulted from a previously conducted position fix. In certain implementations, an initial position may be provided by an external source (e.g., a server database, etc.) and at least a portion of the PR measurements may be based on such "provided" previously estimated position.

Current estimated position information may be determined, for example, based at least in part on the set of PR measurements. Thus, even though the set of PR measurements may include significant errors, a current estimated position fix may be determined nonetheless. Such PR measurement errors may be due to errors of the position information used to construct the PRs and/or other reasons. A set of PR predictions associated with the plurality of SVs may then be determined based, at least in part, on such current estimated position information.

A validation process may then be performed, for example, to determine whether the current estimated position information is 'valid'. For example, the current estimated position information may be determined to be valid or not based, at least in part, on the PR measurement information and the PR predicted information. By way of example, a validation process may be implemented to determine a difference between a PR measurement and a corresponding PR prediction and such difference may be compared with a threshold value. In certain examples, a threshold value may be predetermined or may be dynamically determined. By way of example but not limitation, a difference between a PR measurement and corresponding PR prediction may include a residual associated with the PR measurement and a residual associated with the PR prediction. In certain example implementations, sum-of-squares of a-posteriori measurement residuals associated with a PR measurement and corresponding PR prediction may be compared.

In response to determining that a current estimated position of the device is 'valid', for example, the current estimated position may be used in some manner to operatively support at least one navigation service. In certain example implementations, related position uncertainty information associated with the device may be updated or otherwise stored based, at least in part on the current estimated position if determined to be 'valid'. In response to determining that the current estimated position of the device is not 'valid', for example, new estimated position information may be determined instead, e.g., using more conventional techniques, which may not be as quick to provide estimated position/velocity information.

Also as described in greater detail in subsequent sections, as used herein an SPS may include a variety of like or different types of systems, devices, processes, etc., that are capable in providing and/or otherwise supporting in some manner a position/velocity estimation process. By way of example but not limitation, in certain example implementations an SPS may include one or more global navigation satellite systems (GNSS), such as, the global positioning system (GPS) having a plurality of SVs, and/or one or more terrestrial based networks/devices such as pseudolite, which transmit SPS signals that may be acquired by an SPS enabled device.

As used herein, a position/velocity estimation process may include any process in which a device may be involved, that in some manner is based, at least in part, on SPS related information associated with at least one SPS signal acquired by an SPS receiver in the device and/or a SPS receiver coupled to but external to the device. In certain example implementations, a position/velocity estimation process may include a position/navigation capability that is provided by a device based on locally maintained measurement information. In certain other example implementations, a position/velocity estimation process may include a position/navigation capability that is provided in part by one or more other devices with assistance from a host device based, at least in part, on SPS related information that is communicated between the host device and the one or more other devices.

Figure 1:
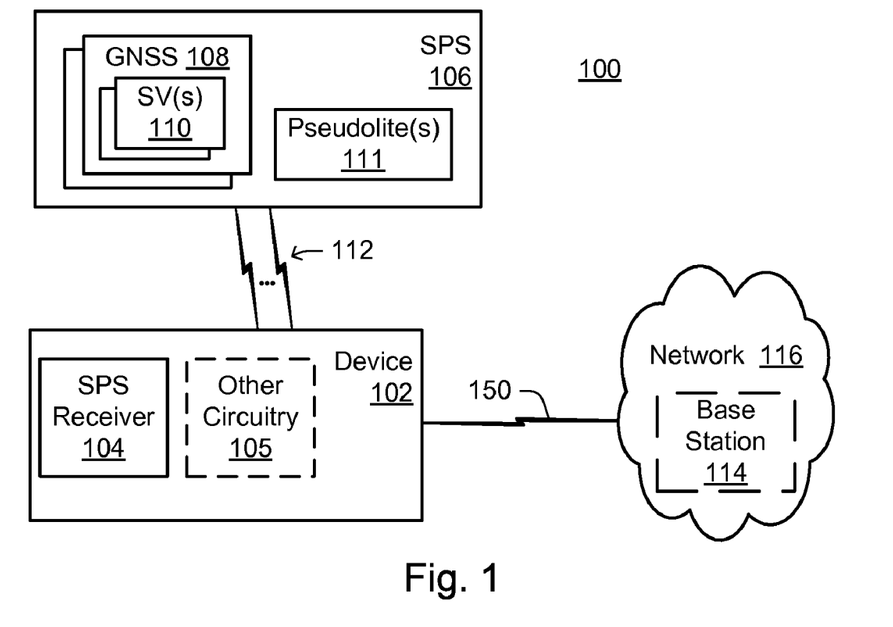
FIG. 1 is a schematic block diagram illustrating an exemplary signaling environment that includes at least one device capable of supporting, at least in part, one or more position/velocity estimation processes based, at least in part, on one or more transmitted and received SPS signals, in accordance with an implementation.

Reference is now made to FIG. 1, which is a schematic block diagram illustrating an exemplary signaling environment 100 that includes at least one device 102 capable of supporting, at least in part, one or more position/velocity estimation processes based, at least in part, on one or more transmitted and received SPS signals, in accordance with an example implementation.

Environment 100 may include various computing and communication resources capable of providing at least some form of a position/velocity estimation process with regard to device 102 based, at least in part, on one or more SPS signals 112 from an SPS 106. Device 102 is representative, therefore, of an electronic device that is capable of performing with or without assistance a position/velocity estimation process based at least in part on SPS signals. Accordingly, device 102 may include or otherwise be operatively coupled to an SPS receiver 104. Thus, for example, device 102 may take the form of a stand-alone navigation circuit or device in certain implementations. In other implementations, as illustrated in the example shown in FIG. 1, device 102 may include other circuitry 105 and/or the like which enables device 102 to perform and/or support other processes. By way of example but not limitation, device 102 may take the form of a mobile or portable computing device or machine that may also be capable of communicating with one or more resources within a wireless/wired communication network 116 over one or more wireless communication links 150 coupled to a base station 114, and/or other like access point. Thus, for example, device 102 may include a mobile station (MS) such as a cellular phone, a smart phone, a personal digital assistant, a portable computing device, a navigation unit, and/or the like or any combination thereof. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

As illustrated in the example in FIG. 1, SPS 106 may, for example, include one or more GNSS 108, each of which may include a different plurality of SVs 110 that may transmit different SPS signals 112. As illustrated, SPS 106 may, for example, include one or more pseudolites 111 and/or other like transmitting devices that may transmit certain SPS signals 112.

Techniques described herein may be used with an "SPS" that includes any one of several GNSS and/or combinations of GNSS. Furthermore, such techniques may be used with positioning systems that utilize pseudolites or a combination of SVs and pseudolites. Pseudolites 111 may, for example, include ground-based transmitters that broadcast a PN code or other ranging code (e.g., similar to a GPS or CDMA cellular signal). Such a transmitter may be assigned a unique PN code so as to permit identification by a remote receiver. Pseudolites may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals" and/or "SV signals", as used herein, is intended to include SPS-like signals from pseudolites or equivalents of pseudolites.

With this in mind and in accordance with certain aspects, some exemplary methods and apparatuses will now be described, which may be implemented in whole or part in one or more devices, such as device 102, to support, at least in part, one or more position/velocity estimation processes based, at least in part, on one or more transmitted and received SPS signals. By way of example, one or more devices 102 may include dedicated and/or special-purpose programmed circuitry capable of providing an estimated position validation process as part of and/or otherwise supporting a reduced time-to-fix position/velocity estimation process.

Figure 2:
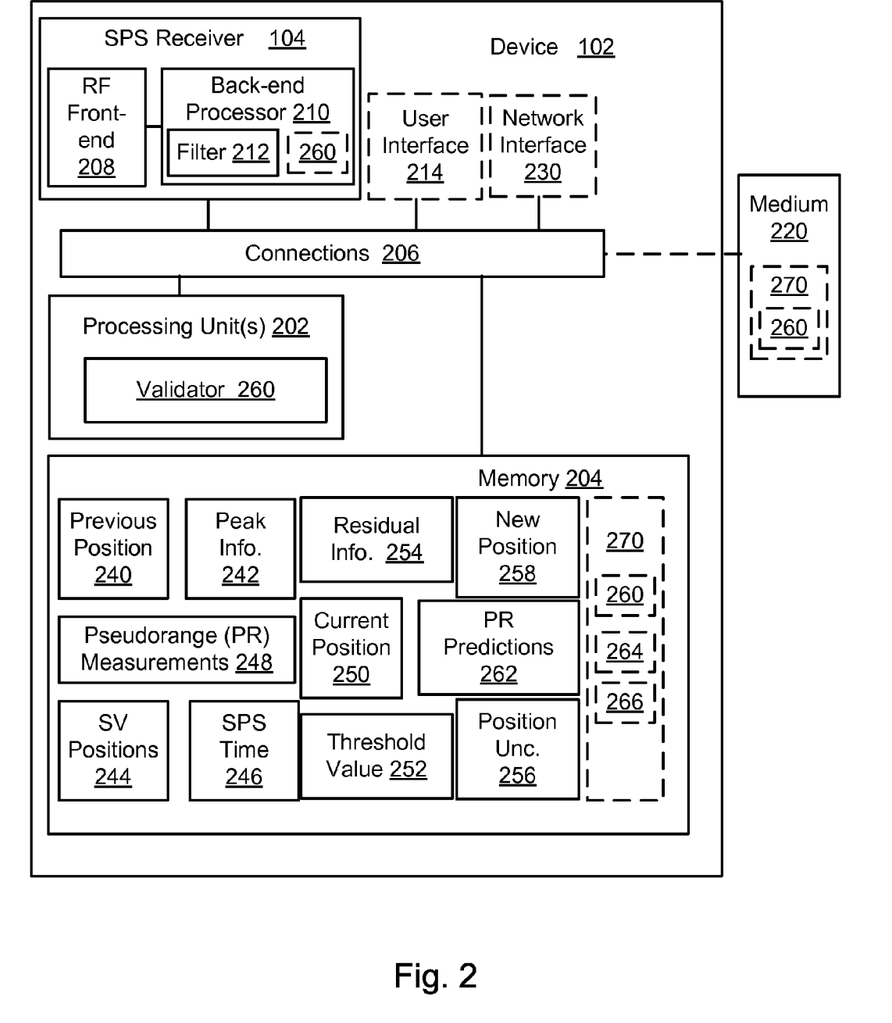
FIG. 2 is a schematic block diagram illustrating certain features of an exemplary device, for example as in FIG. 1, capable of employing a reduced time-to-fix position/velocity estimation process, in accordance with an implementation.

As illustrated in the exemplary schematic block diagram of FIG. 2, in certain example implementations, device 102 may include an SPS receiver 104 capable of receiving an RF signal that includes at least one SPS signal 112. SPS receiver 104 may include, for example, an RF front-end circuit 208 coupled to a back-end processor (processing unit) 210. RF front-end circuit 208 may, for example, provide one or more electronic signals representing one or more SPS signals as received. In certain implementations, back-end processor 210 may process the one or more electronic signals from RF front-end circuit 208 to establish information, such as, for example, all or portions of the information stored in memory 204.

As illustrated in this example, back-end processor 210 may include or otherwise operatively implement, in whole or part, a position/velocity estimation or other like filter 212. By way of example, filter 212 may include a Kalman filter and/or the like which is capable of supporting a position/velocity estimation process based, at least in part, on at least a portion of information such as, for example, all or portions of the information stored in memory 204. In certain other example implementations, all of part of filter 212 and/or memory 204 may be implemented in other circuits within device 102.

Various forms/types of information may be stored in memory 204. By way of example but not limitation, as illustrated in FIG. 2, memory 204 may store previously estimated position information 240, recently detected SPS signal code peak information 242, SV positioning information 244, locally-maintained SPS time information 246, PR measurement information 248, current estimated position information 250, threshold value information 252, residual information 254, position uncertainty information 256, new estimated position information 258, PR predicted information 262, and/or any combination thereof or the like. Memory 204 may have stored therein various other data and computer implementable instructions 270. For example, a validator process 260, navigation service process 264, and/or one or more additional processes 266 may be provided. Such instructions may be executed, for example, by one or more processing units or processors 202/210.

By way of example but not limitation, previously estimated position information 240 may include any position/velocity information associated with device 102 that was previously established in some manner. For example, estimated position information 240 may include an estimated position fix as determined at an earlier point in time. In certain instances, estimated position information 240 may include information determined as a result of one or more position/velocity estimating processes, navigation processes, and/or the like. Thus, in certain instances, estimated position information 240 may be associated with a conventional position/velocity estimating process, while in other instances estimated position information 240 may be associated with an earlier use of validator process 260.

By way of example but not limitation, recently detected SPS signal code peak information 242 may include any information relating to detected SPS signal code peaks and/or other like information relating to the code phase of an SPS signal. Here, for example, SPS receiver 104 may receive SPS signals and based on locally generated versions of PN codes detect candidate peaks that may represent SPS signals that may be fully acquired at some stage.

By way of example but not limitation, SV positioning information 244 may include any information relating to or useful in determining estimated positioning of SVs. For example, SV positioning information 244 may include information related to gpsOneXTRA Assistance™ technology available from Qualcomm, Incorporated of San Diego, Calif., an/or other like SPS related information, almanac information, ephemeris information, and/or or the like, or any combination thereof. Such information may be associated with one or more GNSS, etc.

By way of example but not limitation, locally-maintained SPS time information 246 may include time information associated with all or part of SPS 106 (FIG. 1). Thus, in certain implementations, locally-maintained SPS time information 246 may be associated with one or more GNSS, etc. Locally-maintained SPS time information 246 may, for example, include various offset/conversion related information that may be used to estimate or otherwise determine an applicable SPS time based on a local device/receiver clock/time (not shown).

By way of example but not limitation, PR measurement information 248 may include any information relating to pseudorange or other like measurements associated with one or more SVs. PR measurement information 248 may, for example, be determined by SPS receiver 104 based, at least in part, on previously estimated position information 240 and recently detected SPS signal code peak information 242. In certain example implementations, PR measurement information 248 may, for example, be determined for at least four SVs by SPS receiver 104 based, at least in part, on previously estimated position information 240, and applicable recently detected SPS signal code peak information 242, SV positioning information 244, and locally-maintained SPS time information 246.

By way of example but not limitation, current estimated position information 250 may include any information relating an estimated position of the device, for example, as may be determined by SPS receiver 104 based, at least in part, on at least a portion of PR measurement information 248.

By way of example but not limitation, threshold value information 252 may include predetermined threshold information and/or the like. In certain implementations, threshold value information 252 may include dynamically determined threshold information and/or other like information/instructions that may be used/executed to determine or otherwise identify a threshold value that may be used by validator process 260, for example.

By way of example but not limitation, residual information 254 may include residual and/or other like information that may be associated with one or more PR measurements in PR measurement information 248, and/or one or more PR predictions in PR predicted information 262. For example, in certain implementations, SPS receiver 104 (e.g., using filter 212) may be capable of determining or otherwise identifying such residual information.

By way of example but not limitation, position uncertainty information 256 may include information associated with an uncertainty of estimated position information for the device. Here, for example, position uncertainty information 256 may initially be related to previously estimated position information 240, and later on 'updated', as applicable, to reflect the uncertainty of either current estimated position information 250 (if determined to be 'valid') or possibly a subsequently determined new estimated position information 258.

By way of example but not limitation, new estimated position information 258 may include estimated position information determined using one or more additional processes 266. Here, for example, one or more additional processes 266 may include a conventional position/velocity estimation process.

By way of example but not limitation, PR predicted information 262 may include pseudorange or other like information that may be predicted by SPS receiver 104 and/or processing unit(s) 202 based, at least in part, on current estimated position information 250. For example, filter 212 may include a Kalman filter and/or the like which may be used to predict pseudorange or other like information based, at least in part, on a state associated with current estimated position information 250.

In certain example implementations, SPS receiver 104 and/or processing unit(s) 202/210 may be enabled to exchange one or more electronic signals representing all or part of the information, etc., stored in memory 204, for example, via one or more connections 206.

As mentioned, in certain example implementations, one or more of the example circuits illustrated within device 102 may be operatively responsive to, or otherwise affected in some manner by, computer implementable instructions 270, which may be stored in memory 204. Thus, for example, at least a portion of the computer implementable instructions 270 may be implemented by processing unit(s) 202/210, back-end processor 210, filter 212, communication network interface 230, etc., to provide or otherwise operatively support in some manner the techniques described herein. By way of example but not limitation, as illustrated in FIG. 2, validator process 260 may be provided in whole or part by processing unit(s) 202/210, and/or back-end processor 210. It should be recognized that in certain implementations, one or more of processing unit(s) 202/210 and back-end processor 210 may comprise the same or some common circuitry.

As illustrated in FIG. 2 an article of manufacture represented here by a computer readable medium 220 may be provided and accessed by processing unit(s) 202/210, for example. As such, in certain example implementations, the methods and/or apparatuses may take the form in whole or part of a computer readable medium 220 that may include computer implementable instructions 270 stored thereon, which if executed by at least one processing unit or other like circuitry are enabled to enable the processing unit(s) 202/210 and/or the other like circuitry to perform all or portions of validator process 260 and/or supporting techniques/processes as presented in the examples herein.

Processing unit(s) 202/210 may be implemented in hardware or a combination of hardware and software. Processing unit(s) 202/210 may be representative of one or more circuits configurable to perform at least a portion of a data computing procedure or process. By way of example but not limitation, processing unit(s) 202/210 may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from processing unit(s) 202/210, it should be understood that all or part of a primary memory may be provided within or otherwise co-located/coupled with processing unit(s) 202/210, SPS receiver 104, back-end processor 210, etc. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220.

As illustrated in FIG. 2, in addition to measurement set 242, in support of validator process 260 and/or filter 212, memory 204 may also store one or more electronic signals representing all or portions of the data, information, and/or instructions that may be stored in memory 204. Filter 212 may include, for example, a Kalman filter and/or the like that may be operatively enabled to support position/velocity estimation processes as described herein. For example, filter 212 may be used to establish all or portions of the information stored in memory 204 and/or otherwise used by validator process 260.

As further illustrated in FIG. 2, device 102 may include one or more connections 206 (e.g., buses, lines, conductors, fibers, etc.) to operatively couple the various circuits together and carry one or more electronic signals there between, and a user interface 214 (e.g., display, touch screen, keypad, buttons, knobs, microphone, speaker, etc.) to receive user input and/or provide information to the user. Device 102 may include a communication network interface 230 (e.g., wireless transceiver, modem, antenna, etc.) to allow for communication with one or more other devices over a communication link (e.g., link 150 in FIG. 1).

Figure 3:
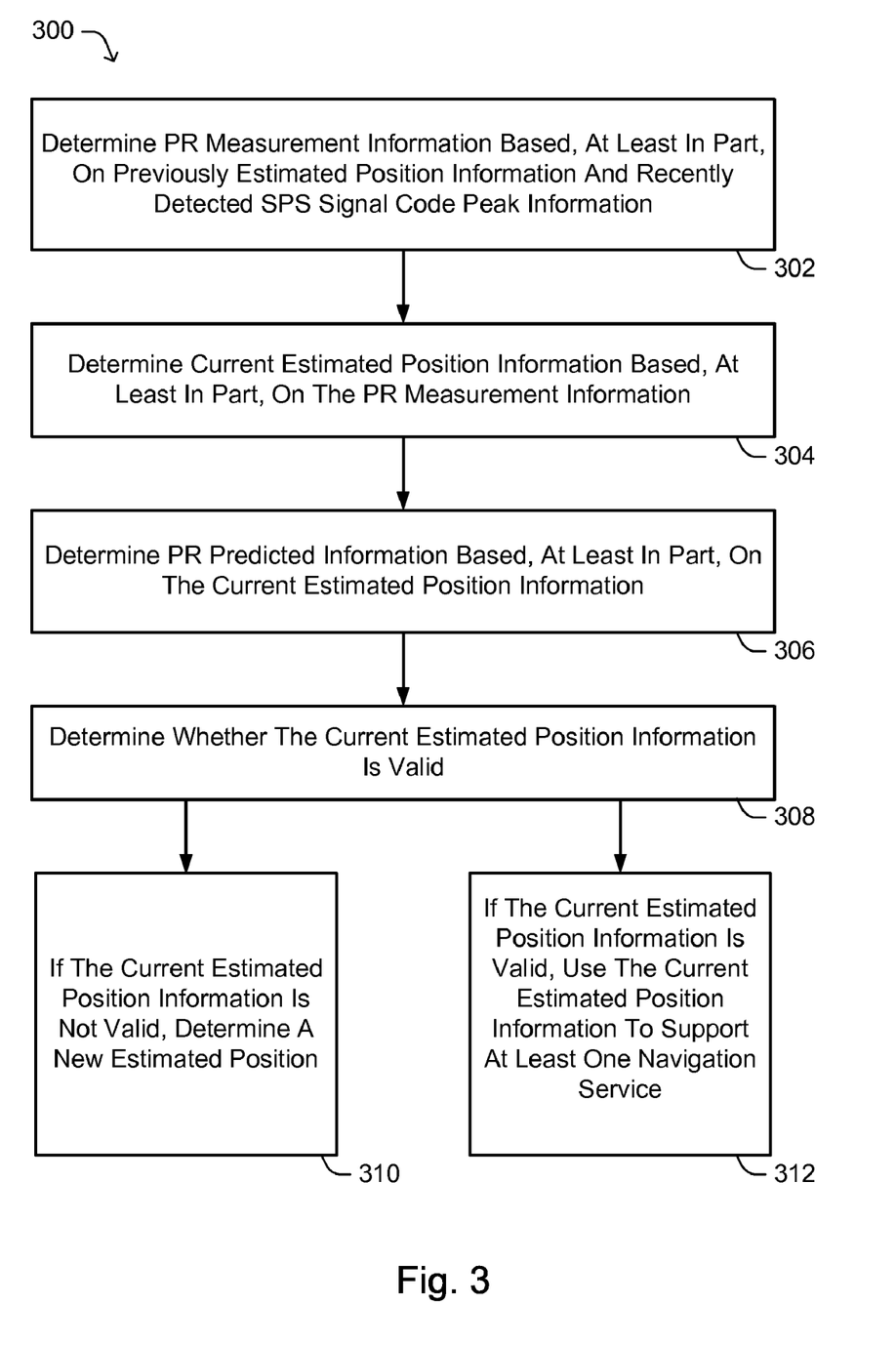

Reference is made next to FIG. 3, which is a flow diagram illustrating an example process 300 that may be implemented in whole or part in a device 102, for example as in FIGS. 1-2, to perform a quick time-to-fix position/velocity estimation process, in accordance with an implementation.

At block 302, PR measurement information may be determined based, at least in part, on previously estimated position information and recently detected SPS signal code peak information. In certain example implementations, at block 302, PR measurement information may, for example, be determined for at least four SVs based, at least in part, on previously estimated position information, and applicable recently detected SPS signal code peak information, SV positioning information, and locally-maintained SPS time information.

At block 304, current estimated position information may be determined based, at least in part, on at least a portion of the PR measurement information. At block 306, PR predicted information may be determined based, at least in part, on the current estimated position information. By way of example but not limitation, PR predicted information may be computed as a geometric range between an SV and a current estimated position plus a current estimated local clock bias (e.g., time bias of the local clock with regard to a GNSS clock). PR measurement information may, for example, be computed as a portion of a geometric range between an SV and a previously estimated position and an SPS signal code peak and possibly an SPS navigation bit edge delay.

At block 306, it may be determined whether the current estimated position information is valid. For example, it may be determined that current estimated position information is valid based on a threshold value being compared directly or indirectly to all or a portion of the current estimated position information. For example, residual information associated with all or a portion of the current estimated position information, and/or all or a portion of PR predicted information may be determined and compared to a threshold value. For example, differences in residual information associated with all or a portion of the current estimated position information, and/or all or a portion of PR predicted information may be determined and compared to a threshold value.

If determined that the current estimated position information is not valid, then, at block 310, a new estimated position may be determined. If determined that the current estimated position information is valid, then, at block 312, the current estimated position information may be used in some manner to support at least one navigation service.

By way of still further example, the techniques presented herein may be particularly useful to devices to improve both a yield and time-to-fix if aiding information is available. For example, aiding information may include information associated with a previous position, SV position and velocity models, and SPS time information. An SPS receiver may, for example, experience improved time-to-fix and yield with such aiding information available and may also experience less than a minimum desired level uncertainty. In certain example aided SPS scenarios, however, such aiding information updates may be infrequent. Often the time between such updates may be as long or longer than one week. SPS time information may, for example, be maintained for more than one week in some implementations, e.g., using a real-time clock. Usage of a previously estimated position, however, with an error above a desired level may result in an erroneous position solution. As such, position uncertainty may sometimes be modeled or otherwise determined as a function of time.

Hence, a device sans the techniques provided herein may face potential uncertainty in terms of yield and time-to-fix. For example, in less than one hour a position uncertainty may exceed a desired level for best performance. In less than one day, for example, the uncertainty of position may increase to a point that it provides only minimal benefit in terms of yield and time-to-fix.

A device in accordance with the techniques provided herein, e.g., as illustrated in the various example methods and apparatuses described and shown herein, may avoid some or all of these potential issues, and/or others. For example, in certain implementations, a validation process may be implemented which may improve a time-to-fix and/or a yield in a device by improving the usability of what may be a highly uncertain initial position. In many cases, for example, an actual position error after one hour or one day may be less than a desired level for best performance; consequently, some traditional modeled position uncertainty techniques would tend to prevent its usage.

With a validation process, for example, a device may determine if certain available aiding or other like considered information may be used successfully. Thus, for example, in certain implementations if the initial position error is too great then the resulting estimated current position may not be determined to be valid. Here, for example, a sum-of-squares of the a-posteriori measurement residuals may be compared against a threshold value to detect to great an error in the position solution. In certain implementations, for example, a probability of missed-detection may be modeled as a function of the satellite geometry, number of degrees-of-freedom, and the magnitude of the pseudorange measurement error (e.g., based on SV position information). Due to the nature of certain aided scenarios, for example, a probability of missed-detection may be reduced to an acceptably low level. This may be because the magnitude of a pseudorange error may be relatively large (e.g., an integer multiple of the distance the speed of light travels in one millisecond). By considering a greater number of degrees-of-freedom, for example, a probability of missed-detection may be reduced. By way of example but not limitation, a Monte Carlo type simulation and/or the like may be used to determine one or more thresholds. In such example simulations, a random position may be generated on a surface of the earth to represent a truth position. This position may be separated from a previously estimated position by (e.g., at a minimum) a distance necessary to generate PR measurement errors. SPS code peaks may be generated based on such truth position. A previously estimated position may, for example, be used with SPS code peaks to generate PR measurements. Position information and a sum of squares residual may, for example, be computed from such PR measurements. A set of outcomes may then be evaluated to determine a rate of missed detection.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   with a satellite positioning system (SPS) receiver enabled device:
   generating one or more electronic signals representing pseudorange (PR) predicted information associated with a plurality of space vehicles (SVs) associated with said SPS based, at least in part, on current estimated position information associated with the device, wherein said current estimated position is based, at least in part, on PR measurement information associated with said plurality of SVs, and wherein said PR measurement information is based, at least in part, on previously estimated position information associated with the device and recently detected SPS signal code peak information;
   determining whether said current estimated position information is valid based, at least in part, on said PR measurement information and said PR predicted information, wherein determining whether said current estimated position information is valid includes obtaining a sum-of-squares of an a-posteriori measurement residual associated with said PR measurement information and said PR predicted information; and
   in response to determining that said current estimated position information is valid, using said current estimated position information to support at least one navigation service associated with the device.

2. The method as recited in claim 1, further comprising:
with said SPS receiver enabled device:
generating one or more electronic signals representing said PR measurement information based, at least in part, on one or more electronic signals representing said previously estimated position information; and
generating one or more electronic signals representing said current estimated position information.

3. The method as recited in claim 2, wherein generating said one or more electronic signals representing said PR measurement information comprises:
generating said one or more electronic signals representing said PR measurement information further based, at least in part, on at least one or more electronic signals representing at least one of SV positioning information, and/or locally-maintained SPS time information.

4. The method as recited in claim 1, further comprising:
in response to determining that said current estimated position information is not valid, initiating at least one additional process to determine a new estimated position of the device.

5. The method as recited in claim 1, wherein determining whether said current estimated position information is valid comprises:
generating one or more electronic signals representing a difference between said PR measurement information and said PR predicted information; and
comparing said difference to a threshold value.

6. The method as recited in claim 5, wherein said threshold value is predetermined and represented by one or more electronic signals stored in a memory of the device.

7. The method as recited in claim 5, wherein said difference between said PR measurement information and said PR predicted information comprises a residual associated with said PR measurement information and said PR predicted information.

8. The method as recited in claim 1, wherein using said current estimated position information in said at least one navigation service comprises:
updating position uncertainty information as represented by one or more electronic signals stored in a memory of the device.

9. The method as recited in claim 1, wherein said SPS comprises one or more Global Navigation Satellite Systems.

10. The method as recited in claim 1, wherein the device comprises a mobile station.

11. An apparatus comprising:
a front-end receiver to receive satellite positioning system (SPS) signals from a plurality of space vehicles (SVs);
memory having stored therein previously estimated position information; and
one or more processing units coupled to said memory and said front-end receiver to:
determine pseudorange (PR) measurement information associated with said plurality of SVs based, at least in part, on said previously estimated position information and recently detected SPS signal code peak information;
determine current estimated position information based, at least in part, on said PR measurement information;
determine PR predicted information associated with said plurality of SVs based, at least in part, on said current estimated position information;
determine whether said current estimated position information is valid based, at least in part, on said PR measurement information and said PR predicted information, wherein determining whether said current estimated position information is valid includes obtaining a sum-of-squares of an a-posteriori measurement residual associated with said PR measurement information and said PR predicted information; and
operatively support at least one navigation service using said current estimated position information in response to determining that said current estimated position of the device is valid.

12. The apparatus as recited in claim 11, wherein said one or more processing units to determine said PR measurement information further based, at least in part, at least one of:
recently detected SPS signal code peak information, SV positioning information, and/or locally-maintained SPS time information.

13. The apparatus as recited in claim 11, wherein said one or more processing units further determine new estimated position information in response to determining that said current estimated position of the device is not valid.

14. The apparatus as recited in claim 11, wherein said one or more processing units further determines a difference between said PR measurement information and said PR predicted information, and compare said difference to a threshold value.

15. The apparatus as recited in claim 14, wherein said threshold value is predetermined and stored in said memory.

16. The apparatus as recited in claim 14, wherein said difference between said PR measurement information and said PR predicted information comprises a residual associated with said PR measurement information and said PR predicted information.

17. The apparatus as recited in claim 11, wherein said one or more processing units operatively supports said at least one navigation service by at least updating position uncertainty information stored in said memory.

18. The apparatus as recited in claim 11, wherein said SPS comprises one or more Global Navigation Satellite Systems.

19. The apparatus as recited in claim 11, further comprising a wireless communications interface coupled to at least one of said front-end receiver, said memory, and/or said one or more processing units.

20. An article comprising:
a non-transitory computer readable medium having computer implementable instructions stored thereon that in response to being executed by one or more processing units in an electronic device cause the electronic device to:
determine pseudorange (PR) measurement information associated with satellite positioning system (SPS) signals received from a plurality of space vehicles (SVs) based, at least in part, on previously estimated position information and recently detected SPS signal code peak information;
determine current estimated position information based, at least in part, on said PR measurement information;
determine PR predicted information associated with said plurality of SVs based, at least in part, on said current estimated position information;
determine whether said current estimated position information is valid based, at least in part, on said PR measurement information and said PR predicted information, wherein determining whether said current estimated position information is valid includes obtaining a sum-of-squares of an a-posteriori measurement residual associated with said PR measurement information and said PR predicted information; and operatively support at least one navigation service using said current estimated position information in response to determining that said current estimated position of the device is valid.

21. The article as recited in claim 20, wherein the computer implementable instructions in response to being executed by the one or more processing units in the electronic device further enable the electronic device to determine said PR measurement information further based, at least in part, at least one of:

recently detected SPS signal code peak information, SV positioning information, and/or locally-maintained SPS time information.

22. The article as recited in claim 20, wherein the computer implementable instructions in response to being executed by the one or more processing units in the electronic device further enable the electronic device to determine new estimated position information in response to determining that said current estimated position of the device is not valid.

23. The article as recited in claim 20, wherein the computer implementable instructions in response to being executed by the one or more processing units in the electronic device further enable the electronic device to determine a difference between said PR measurement information and said PR predicted information, and compare said difference to a threshold value.

24. The article as recited in claim 23, wherein said threshold value is predetermined.

25. The article as recited in claim 23, wherein said difference between said PR measurement information and said PR predicted information comprises a residual associated with said PR measurement information and said PR predicted information.

26. The article as recited in claim 20, wherein the computer implementable instructions in response to being executed by the one or more processing units in the electronic device further enable the electronic device to update position uncertainty information.

27. The article as recited in claim 20, wherein said SPS comprises one or more Global Navigation Satellite Systems.

\* \* \* \* \*